(12) United States Patent
LeFevre et al.

(10) Patent No.: US 9,296,219 B1
(45) Date of Patent: Mar. 29, 2016

(54) RELEASE AGENT COMPOSITION FOR IMPROVED COEFFICIENT OF FRICTION

(71) Applicant: Xerox Corporation, Norwalk, CT (US)

(72) Inventors: Jason M. LeFevre, Penfield, NY (US); Paul J. McConville, Webster, NY (US); James M. Chappell, Webster, NY (US); Joanne L. Lee, Rochester, NY (US); Rachael L. McGrath, Churchville, NY (US); Santokh S. Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/938,609

(22) Filed: Nov. 11, 2015

Related U.S. Application Data

(62) Division of application No. 14/260,659, filed on Apr. 24, 2014, now Pat. No. 9,221,245.

(51) Int. Cl.
| | |
|---|---|
| *B41J 2/17* | (2006.01) |
| *B41J 2/015* | (2006.01) |
| *B41J 2/21* | (2006.01) |
| *B41J 2/005* | (2006.01) |
| *C09D 11/00* | (2014.01) |
| *B41J 11/00* | (2006.01) |

(52) U.S. Cl.
CPC ............. *B41J 2/2114* (2013.01); *B41J 2/0057* (2013.01); *B41J 11/0015* (2013.01); *C09D 11/00* (2013.01)

(58) Field of Classification Search
CPC .. B41J 11/0015; B41J 2/2114; B41J 2/17593; B41J 2/0057; C09D 11/38; C09D 11/00; B41M 5/0256; B41M 5/0047
USPC .................................................. 347/21, 95, 99
See application file for complete search history.

(56) References Cited

U.S. PATENT DOCUMENTS

| | | | |
|---|---|---|---|
| 7,208,259 B2 * | 4/2007 | Badesha | C09D 183/08 399/333 |
| 9,108,427 B1 * | 8/2015 | LeFevre | B41J 2/0057 |

* cited by examiner

*Primary Examiner* — An Do
(74) *Attorney, Agent, or Firm* — Maginot Moore & Beck LLP

(57) ABSTRACT

A functional amine release agent displaying reduced coefficient of friction as compared to standard silicone oils, comprises a polydimethylsiloxane oil and a functional amine selected from the group consisting of pendant propylamines and pendant N-(2-aminoethyl)-3-aminopropyl. The concentration of functional amine to polydimethylsiloxane oil is approximately less than 0.0001 meq/g. According to certain embodiments, the functional amine release agent is operable to impart a coefficient of friction of about 0.5 or more to the print media, resulting in improved finishing and converting equipment interaction. The release agent may have a viscosity of about 50 cSt.

5 Claims, 5 Drawing Sheets

RELEASE AGENT COMPOSITION FOR IMPROVED COEFFICIENT OF FRICTION

REFERENCE TO RELATED APPLICATION AND PRIORITY CLAIM

This application is a divisional of co-pending utility application Ser. No. 14/260,659, filed on Apr. 24, 2014 and entitled "Release Agent Composition for Improved Coefficient of Friction", the entire disclosure of which is incorporated herein by reference.

BACKGROUND

Solid inkjet imaging systems generally use an electronic form of an image to distribute ink melted from a solid ink stick or pellet in a manner that reproduces the electronic image. In some solid inkjet imaging systems, the electronic image may be used to control the ejection of ink directly onto a media sheet. In other solid inkjet imaging systems, the electronic image is used to operate printheads to eject ink onto an intermediate imaging member. A media sheet is then brought into contact with the intermediate imaging member in a nip formed between the intermediate member and a transfer roller. The heat and pressure in the nip help transfer the ink image from the intermediate imaging member to the media sheet, which is transported from the system and deposited in a paper tray.

In solid ink imaging systems having intermediate imaging members, ink is loaded into the system in a solid form, either as pellets or as ink sticks, and transported through a feed chute by a feed mechanism for delivery to a melting device. The melting device heats the solid ink to its melting temperature and the liquid ink is delivered to a printhead for jetting onto an intermediate imaging member. In the print head, the liquid ink is typically maintained at a temperature that enables the ink to be ejected by the printing elements in the print head, but that preserves sufficient tackiness for the ink to adhere to the intermediate imaging member. In some cases, however, the tackiness of the liquid ink may cause a portion of the ink to remain on the intermediate imaging member after the image is transferred onto the media sheet and the residual ink may later degrade other ink images formed on the intermediate imaging member.

In continuous-web, direct-to-media printing, a fixing assembly is used after the ink is ejected onto the print media or web to fix the ink to the web. The fixing assembly used depends on the type of ink. For example, when using melted phase change ink to form images, the fixing assembly may include a pair of rollers that defines a nip for applying pressure to the ink and web to spread the ink on the web as the web passes through the nip, as depicted in FIG. 5. The function of the pair of rollers, also referred to herein as a spreader, is to transform a pattern of ink drops deposited onto a web by flattening and spreading the ink drops to make a more uniform and continuous layer. The spreader uses pressure and heat to reduce the height of the ink droplets and fill the spaces between adjacent drops.

One difficulty faced in the operation of the spreader is providing the web and the ink deposited on the web to the spreader at a temperature that enables the ink deposited on the web to be spread uniformly for high image quality. Due to very fast processing speeds at which some continuous feed imaging devices operate, the ink deposited on the web at the print station may be above a suitable temperature range as the image passes through the nip. This high ink temperature results in the ink bleeding into the web and possibly showing through to the opposite side of the media web. Conversely, if the ink cools below the suitable temperature range prior to reaching the spreader, the ink may not be malleable enough to allow for sufficient line spread or adherence to the web. In addition, the ink ejected by the printheads is generally much hotter than the print medium, and, consequently, areas imaged with high ink coverage may exit from the print zone at higher temperatures than the areas of the media web where little or no ink was ejected. Ink that enters the spreader at varying temperatures can cause inconsistent and non-uniform line spread on the web, reducing image quality. Thus, improved media and ink temperature equalization is desirable. For optimum spreader performance, ink and web temperatures are substantially equalized prior to entering the nip to within a target temperature range that promotes adherence of the melted ink to the web, minimizes visibility of printed ink from the opposite side of the media ("show-through"), maximizes ink dot spread, and reduces image defects on the opposite side of the media in a duplex printing process. The target temperature range for the ink and web prior to entering the nip can also be referred to as the pre-spreading temperature range. In one embodiment, the pre-spreading temperature range is between about 50° C. and about 55° C. The pre-spreading temperature range, however, can be any suitable range of temperatures suitable for spreading ink on a web depending on factors such as the ink formulation, web substrate material, web velocity, and the like.

To address and/or prevent the accumulation of ink on an intermediate imaging member or on a spreader, which may be in the form of a drum, solid ink imaging systems may be provided with a drum maintenance unit (DMU), as shown in FIG. 5, that releases an oil or an oil blend that lubricates the image receiving surface of the intermediate imaging member before each print cycle, thereby preventing ink offset to the spreader drum. Typically, these DMU oils are silicone oils that may contain additives to allow for proper lubrication and release characteristics.

However, use of known DMU oils often results in imparting a coefficient of friction to the media being printed that is significantly lower than that of the native media. As such, the printed media is more slippery than native media, which can interfere with many downstream production finishing or converting equipment that is used, for example, to handle, cut, fold, insert (as in mail-envelope inserters) or collate the printed material leaving the print engine. Specifically, production finishing or converting equipment is typically calibrated to handle media having the coefficient of friction similar to native paper. Therefore, imparting printed media with a lower coefficient of friction through the use of DMU oils often results in feeding failures and/or production failures with production finishing or converting equipment.

As such, a DMU oil formulation for use in solid ink jet color web-press printers is desirable that provides sufficient lubrication to an image receiving surface of the intermediate imaging member and image fixing members (i.e. a spreader drum) without imparting a coefficient of friction to the printed media that interferes with production finishing or converting equipment.

SUMMARY

According to certain embodiments, the present application relates to a functional amine release agent comprising: a polydimethylsiloxane oil and a functional amine selected from the group consisting of pendant propylamines and pendant N-(2-aminoethyl)-3-aminopropyl whereby the ratio of functional amine to polydimethylsiloxane oil is approximately 0.0001 meq/g. The release agent may have a viscosity of about 50 cSt. According to certain embodiments, the functional amine release agent is operable to impart a coefficient of friction of not less than about 0.4 to a print media when placed in contact with said media. In other optional embodiments, the functional amine release agent is operable to impart a coefficient of friction of not less than about 0.5 to a print media when placed in contact with said media.

According to at least one embodiment, the present application relates to method for printing an image in a solid ink jet color web-press printer, comprising: providing an ink jet printer selected from the group consisting of: a solid ink jet color web-press printer having an intermediate imaging member and a solid ink jet color web-press that prints using the direct-to-paper process; providing a functional amine release agent comprising a polydimethylsiloxane oil and a functional amine selected from the group consisting of pendant propylamines and pendant N-(2-aminoethyl)-3-aminopropyl; and printing an image on a print media, whereby a resulting print surface has a coefficient of friction greater than about 0.3. In certain optional embodiments, the concentration of functional amine to polydimethylsiloxane oil is approximately 0.0001 meq/g.

According to one aspect, the printing process is performed using image fixing members, such as a spreader drum and a pressure roll, and the release agent of the present invention allows reduction of certain print process offset threshold temperatures for these components for simplex printing. In one embodiment, the release agent disclosed herein permits a reduction in the simplex offset threshold to a temperature that is 5° C. lower than the standard silicone DMU oil.

DETAILED DESCRIPTION

Figure 1:
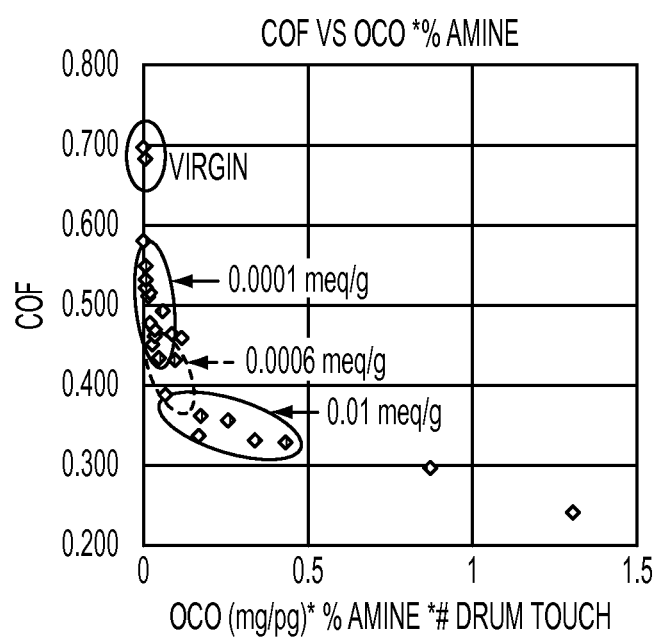
FIG. 1 is a graph of coefficient of friction as a function of amine percentage in a release agent.

For the purposes of promoting an understanding of the principles of the invention, reference will now be made to the embodiments described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

According to certain embodiments of the present application, a release agent composition for solid inkjet imaging systems is disclosed. As discussed above, release agent compositions for solid inkjet imaging systems are typically administered by an intermediate imaging member via a delivery mechanism such as a drum maintenance unit ("DMU") delivery roll that may be at least partially immersed in a sump containing one or more release agent compositions. In certain embodiments, a release agent composition of the present application is provided to the intermediate imaging member in an amount of from about 1 mg per sheet of blank A4 sized paper to about 4 mg per sheet of blank A4 paper, and about 4 mg per sheet of blank A4 paper to about 10 mg per sheet of A4 paper for 100% solid-fill. The system by which a release agent composition is provided to an intermediate imaging member is well known, and may be accomplished in a continuous or semi-continuous manner.

In certain embodiments, a release agent according to the present invention comprises a silicone oil and at least one functional amine group, resulting in a composition that does not impart a significant negative reduction in the coefficient of friction to print media that might come in contact with the release agent. In particular, it has been found that utilizing a release agent which imparts a coefficient of friction of less than about 0.4, less than about 0.3, or less than about 0.2 to the print media results in increasing degradation in performance in high speed production finishing and production equipment. As such, according to at least one exemplary embodiment, a release agent composition for solid inkjet imaging systems comprises approximately 99.9999% by mole % non-functional silicone oil, and approximately 0.0001% by mole % functional amine.

According to certain exemplary embodiments, a release agent comprises an amino functionalized polydimethylsiloxane release agent created by utilizing an amine-containing polydimethylsiloxane concentrate and subsequently diluting with nonfunctional polyorganosiloxane oil to provide a release agent with a relatively consistent distribution of amines in a large volume of polydimethylsiloxane oil. In producing the amine-containing polydimethylsiloxane concentrate, an end blocker, amino siloxane, catalyst and octamethyltetracyclosiloxane are reacted in a vessel at elevated temperature (of from about 100 to about 210.degree. C., or from about 145 to about 185.degree. C.), for a desired time (of from about 2 to about 15 hours, or from about 5 to about 10 hours). The resulting reaction product is then diluted with non-functional polydimethylsiloxane for use as a release agent composition for solid inkjet imaging. In accordance with the present disclosure, the amount and concentration of the non-functional polydimethylsiloxane may be adjusted depending upon the initial coefficient of friction of the print media, but should result in a composition which does not impart a coefficient of friction (COF) that is less than about 0.4, and preferably not less than about 0.5 to the paper or media being printed upon by the solid inkjet printer. It will be appreciated that blending may be performed according to blending techniques provided by Wacker Silicones Corp. of Adrian Mich. According to other certain embodiments, the amount and concentration of the non-functional polydimethylsiloxane may be adjusted depending upon the initial coefficient of friction of the print media, but should result in a composition which does not reduce the coefficient of friction to the paper or media being printed upon by the solid inkjet printer by more than about 0.2.

According to certain exemplary embodiments, suitable amino-functional release agents include pendant propylamines and pendant N-(2-aminoethyl)-3-aminopropyl functional groups. For example, according to certain embodiments, a pendant propylamine release agent include those having the following structure:

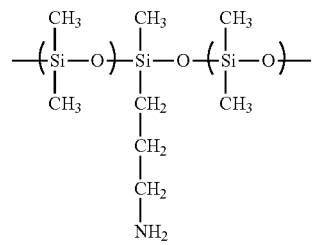

Further, according to certain embodiments, a pendant N-(2-aminoethyl)-3-aminopropyl release agent include those having the following structure:

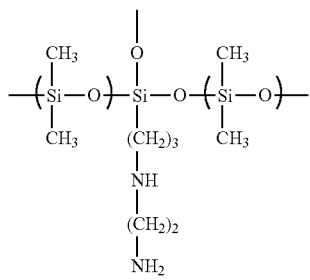

Alternatively, a blend of two amino-functional release agent materials can be used as the release agent composition. For example, a blend of two or more of the above-described amino-functional release agents can be used. In certain embodiments, the blend comprises two different release agent materials of the above structures. In other embodiments, a blend of two or more different amino-functional release agents having the above amine concentrations can be used.

According to certain alternative embodiments, amine stabilizers are utilized, such as hindered amine light stabilizers including 2,2,6,6-tetramethyl piperidine and its derivatives.

As can be seen by the following exemplary embodiments, the use of amino-functional release agents according to the disclosure herein results in an increased coefficient of friction with respect to standard polydimethylsiloxane oils.

EXAMPLE 1

According to one exemplary embodiment, a pendant N-(2-aminoethyl)-3-aminopropyl release agent was created according to the above system by adding an amine-containing polydimethylsiloxane concentrate and subsequently diluting with polydimethylsiloxane to a concentration of approximately 0.0001 meq/g. Thereafter, the pendant N-(2-aminoethyl)-3-aminopropyl release agent was administered to a solid ink jet color web-press printer, and the printer was used to process print jobs as compared to a standard silicone oil. In this instance, the standard silicone oil used was Copy-Aid 270; 72 cSt, 0.01 meq/g functional amine (available from Wacker Silicones; Adrian, Mich., USA). The graph of FIG. 1 shows a comparison of the COF for the release agent of the present invention (0.0001 meq/g) as compared to the COFs for virgin substrate, the standard silicone oil (0.01 meq/g) and an intermediate release agent (0.0006 meq/g). This graph demonstrates that the release agent disclosed herein (0.0001 meq/g) results in a COF of greater than 0.4 and greater than 0.5, whereas the other release agents produces significantly lower COFs approaching half the COF of the virgin substrate.

Figure 2:
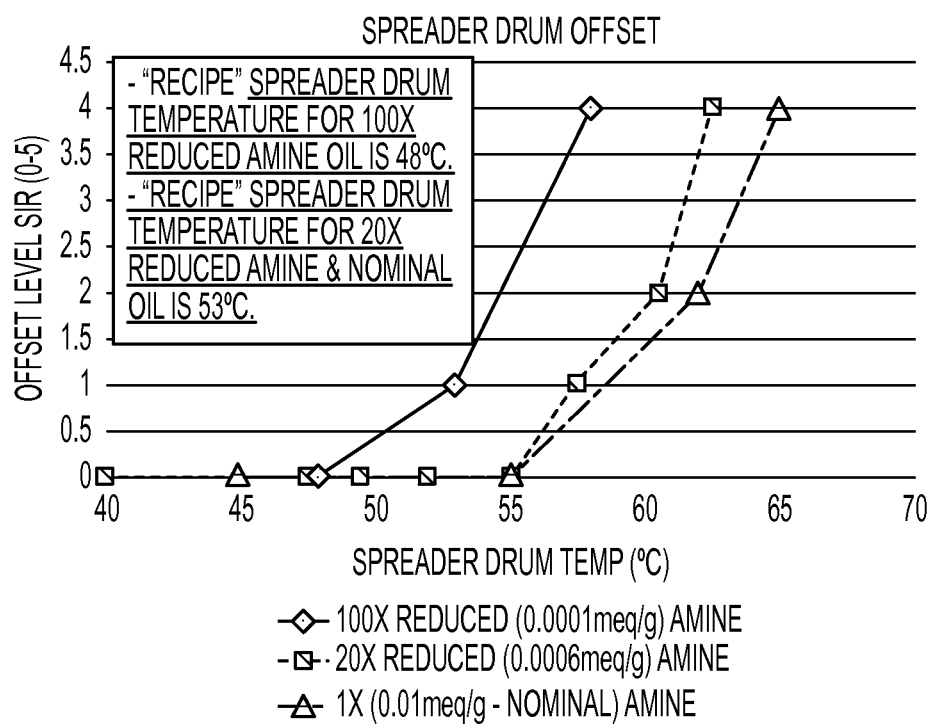
FIG. 2 is a graph of spreader drum offset level as a function of temperature and release agent composition.
Figure 3:
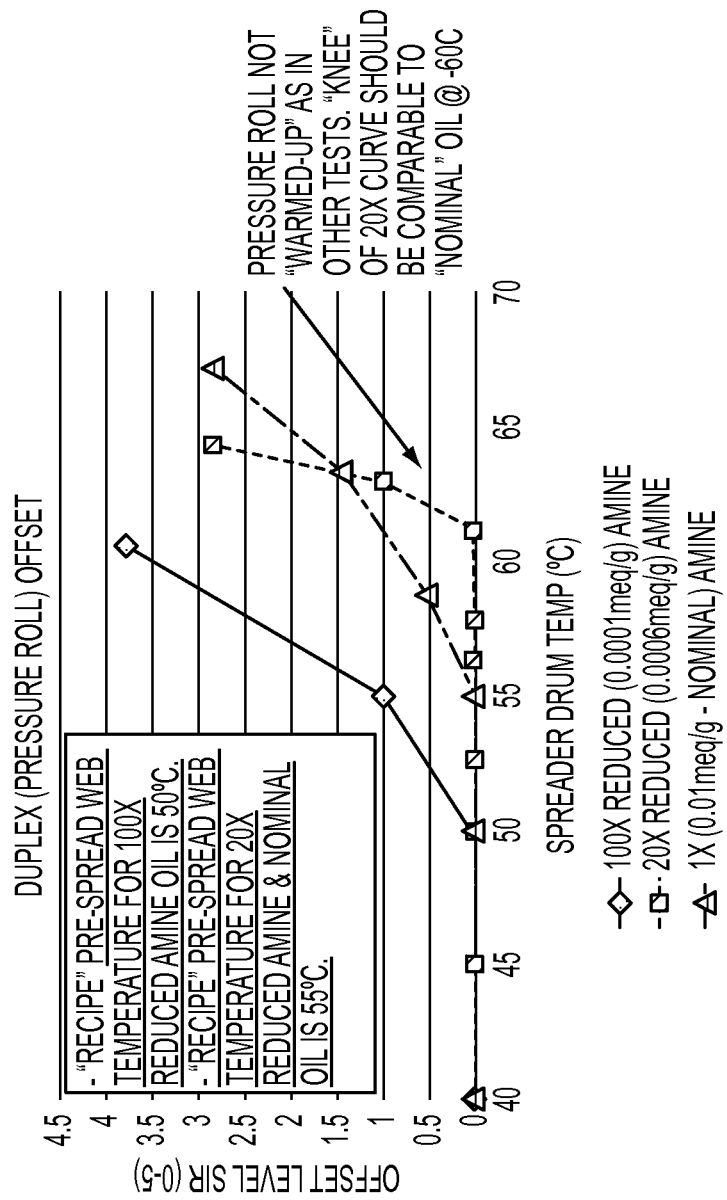
FIG. 3 is a graph of pressure roll offset level as a function of temperature and release agent composition.

The above testing substantiates that the reduction in number of amine molecules present on the substrate leads to a corresponding increase in COF of the printed output. In accordance with the present invention, a 100× reduction in amine molecules from the standard DMU release agent to the 0.0001 meq/g value of the present disclosure can provide a significant advantage over the prior release agents, particularly in conjunction with demanding finishing equipment requirements. However, the release agent of the present invention allows reduction of certain print process offset threshold temperatures. FIG. 2 is a graph of spreader drum offset levels as a function of spreader drum temperature for simplex printing. FIG. 3 is a similar graph for pressure roll offset levels in duplex printing. As reflected in FIG. 2, the lower meq/g release agent drops the simplex offset threshold to 53° C. (at offset level 1.0), which delivers a spreader drum recipe temperature of 48° C. that is 5° C. lower than the standard silicone DMU oil. FIG. 3 shows a similar 5° C. decrease for duplex operation in which the pre-spread web temperature is about 50° C. vs. the 55° C. temperature for the standard oil. It has been found in the testing that in the apex mode, the upper turn roll offset threshold is generally unchanged with the release agent of the present disclosure.

Figure 4:
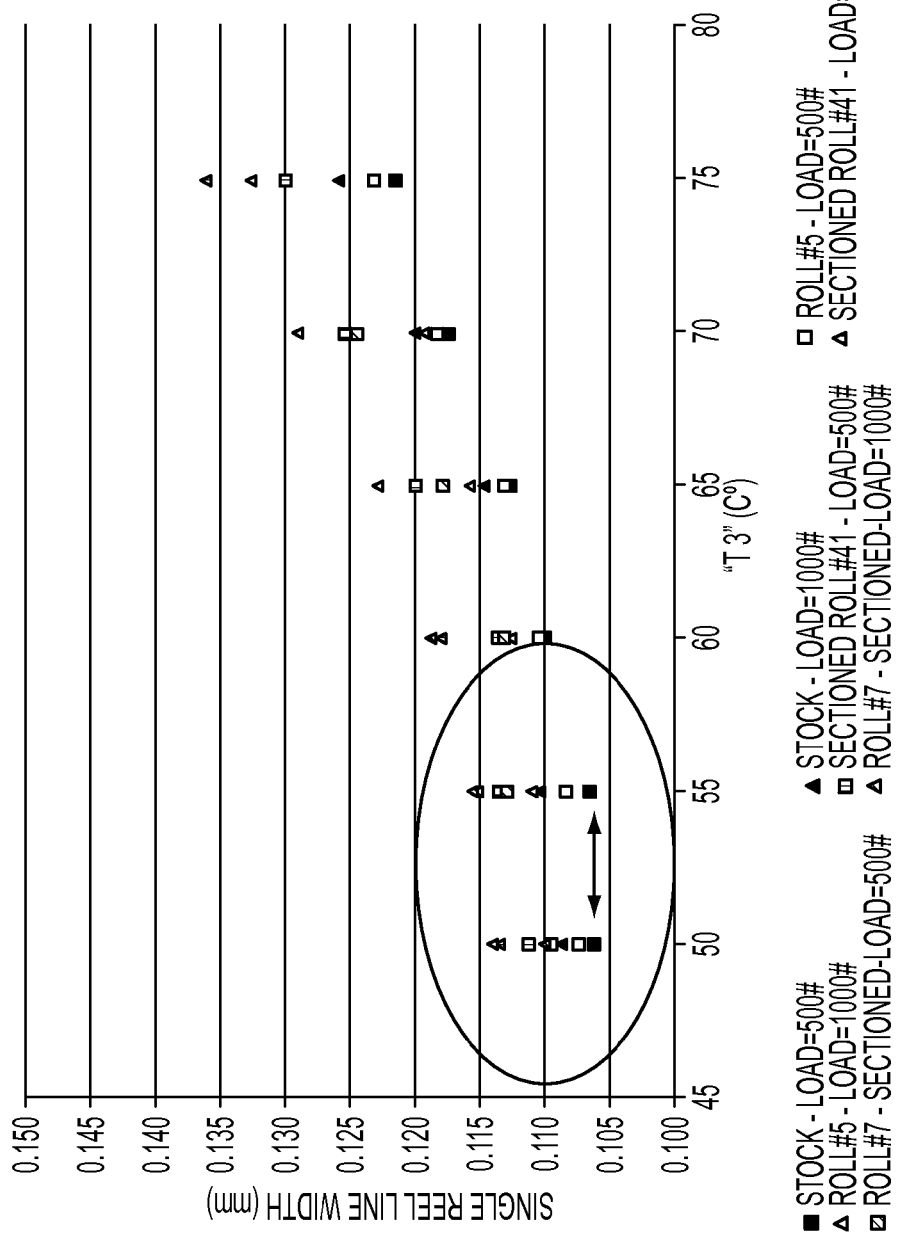
FIG. 4 is a graph showing a comparison of ink spreading as a function of temperature.
Figure 5:
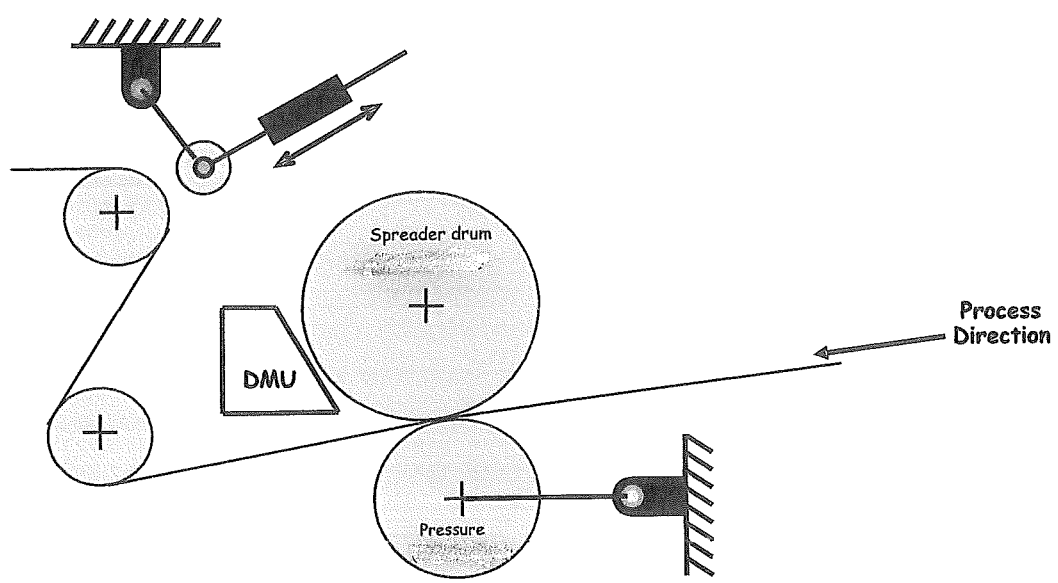
FIG. 5 is a diagram of a fixing assembly in a print machine.

The graph of FIG. 4 illustrates the effect of the 5° C. decrease in threshold temperatures. In particular, this graph shows that the reduced temperature does not result in a significant decrease in the amount of ink spread (as measured by line width) delivered in the spreader system. In practical terms, use of the release agent of the present disclosure will not negatively impact the image quality in any print mode While the invention has been described in detail with reference to specific and preferred embodiments, it will be appreciated that various modifications and variations will be apparent to one of ordinary skill in the art. All such modifications and embodiments as may readily occur to one skilled in the art are intended to be within the scope of the appended claims.

What is claimed is:

1. A method for printing an image in a solid ink jet printer having an intermediate imaging member, comprising;
    applying a functional amine release agent to the intermediate imaging member, the release agent comprising a polydimethylsiloxane oil and a functional amine selected from the group consisting of pendant propylamines and pendant N-(2-aminoethyl)-3-aminopropyl; and
    printing an image on a print media using the intermediate imaging member, whereby a resulting print surface has a coefficient of friction greater than about 0.5.

2. The method of claim 1, wherein the print media is paper.

3. The method of claim 1, wherein the concentration of functional amine to polydimethylsiloxane oil is approximately less than 0.0001 meq/g.

4. The method of claim 3, wherein the functional amine release agent has a viscosity of about 50 cSt.

5. The method of claim 1, wherein the intermediate imaging member includes a spreader drum onto which the release agent is applied, and the method further comprises heating the spreader drum to no more than 48° C.

* * * * *